(12) United States Patent
Schneider et al.

(10) Patent No.: US 8,973,442 B2
(45) Date of Patent: Mar. 10, 2015

(54) ULTRASONIC SENSOR

(75) Inventors: Michael Schneider, Karlsbad (DE);
Frank Hoenes, Ditzingen (DE); Olaf Jordanek, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 308 days.

(21) Appl. No.: 13/511,338

(22) PCT Filed: Oct. 6, 2010

(86) PCT No.: PCT/EP2010/064864
§ 371 (c)(1),
(2), (4) Date: Aug. 7, 2012

(87) PCT Pub. No.: WO2011/060999
PCT Pub. Date: May 26, 2011

(65) Prior Publication Data
US 2012/0304772 A1 Dec. 6, 2012

(30) Foreign Application Priority Data

Nov. 23, 2009 (DE) .......................... 10 2009 046 972

(51) Int. Cl.
H04R 17/00 (2006.01)
G01D 11/10 (2006.01)
G01F 1/00 (2006.01)
G01S 15/00 (2006.01)
G01S 7/521 (2006.01)
G10K 11/00 (2006.01)

(52) U.S. Cl.
CPC ............... *G01S 7/521* (2013.01); *G10K 11/004* (2013.01)
USPC ............. 73/632; 73/430; 73/861.18; 367/140

(58) Field of Classification Search
USPC .............................. 73/632, 649, 430, 861.18;
310/324–327, 334–336; 367/140, 367/173–176, 162–165
See application file for complete search history.

(56) References Cited

U.S. PATENT DOCUMENTS 6,374,676 B1 * 4/2002 Arnold et al. ................... 73/632
7,929,377 B2 * 4/2011 Wehling et al. ................ 367/140
8,080,922 B2 * 12/2011 Reiche .......................... 310/348

(Continued)

FOREIGN PATENT DOCUMENTS

DE 38 32 947 3/1990
DE 38 32 948 3/1990

(Continued)

*Primary Examiner* — Helen Kwok
(74) *Attorney, Agent, or Firm* — Kenyon & Kenyon LLP

(57) ABSTRACT

An ultrasonic sensor, including a diaphragm cup, a housing and a decoupling element, the diaphragm cup and housing having a lateral surface, the decoupling element being at least partially made from an elastic material and having a continuous recess bounded by an inner wall of the decoupling element, the diaphragm cup and/or the housing being at least partially situated in the recess. To prevent sound being transmitted through a gap between the diaphragm cup and the decoupling element and/or between the housing and the decoupling element, the inner wall of the decoupling element is tautened by the contraction of elastic material at least around an area of the lateral surface of the diaphragm cup, circumferentially surrounding the diaphragm cup and/or the housing, and/or a lacquer layer applied on the lateral surface of the diaphragm cup, and/or the lateral surface of the housing so that the inner wall in this area rests flush against the lateral surface of the diaphragm cup and/or the lacquer layer applied on the lateral surface of the diaphragm cup and/or the lateral surface of the housing.

11 Claims, 2 Drawing Sheets

(56) References Cited

U.S. PATENT DOCUMENTS

| | | | |
|---|---|---|---|
| 8,276,445 B2 * | 10/2012 | Reiche | 73/430 |
| 8,587,182 B2 * | 11/2013 | Reiche | 310/322 |
| 8,596,139 B2 * | 12/2013 | Mueller et al. | 73/861.18 |
| 2009/0196121 A1 | 8/2009 | Wehling et al. | |
| 2012/0260742 A1 * | 10/2012 | Mueller et al. | 73/861.18 |

FOREIGN PATENT DOCUMENTS

| | | |
|---|---|---|
| DE | 102 37 720 | 2/2004 |
| DE | 102 37 721 | 2/2004 |
| DE | 10 2006 028213 | 12/2007 |
| DE | 10 2007 043500 | 3/2009 |
| EP | 1 710 785 | 10/2006 |
| EP | 1 752 967 | 2/2007 |
| JP | 1-127987 | 5/1989 |
| JP | 2004-15150 | 1/2004 |
| JP | 2006-352829 | 12/2006 |
| JP | 2009-540706 | 11/2009 |
| WO | 02/12027 | 2/2002 |
| WO | 2007/144047 | 12/2007 |
| WO | WO 2008/025608 * | 3/2008 |
| WO | WO 2008/049681 * | 5/2008 |

* cited by examiner

ULTRASONIC SENSOR

FIELD OF THE INVENTION

The present invention relates to an ultrasonic sensor and an ultrasonic sensor system.

BACKGROUND INFORMATION

For sonic decoupling between the diaphragm cup (ultrasonic generator) and the sensor housing or the sensor receptacle in the bumper, a silicone ring is usually used as a decoupling element. An assemblage between the diaphragm cup and the sensor housing is intended both to avoid parasitic sonic radiation as well as to dampen structure-borne noise impressed by the sensor diaphragm. Ultrasonic sensors having decoupling elements are discussed in patent documents US 2009/0196121 A1, WO 2007/144047, DE 102 37 720 A1, DE 102 37 721 A1 and DE 10 2007 043 500 A1.

It is believed that it may not be possible to ensure that no gap exists between the decoupling element and the diaphragm cup or the housing through which sound enters in the axial direction and results in malfunctions. In particular, a visual check of the area between the decoupling element and the housing is no longer possible after installation. This also applies especially in the case in which, on the viewing side, the decoupling element ends flush with the diaphragm cup. Thus, the situation may arise, in which the sound of the diaphragm cup exits through the gap and results in a sound propagation into undesired spaces such as the rear space of the bumper. Furthermore, there exists the possibility that the structure-borne sound is not damped and reinforces the effect of the unmotivated sonic radiation. Non-planar surfaces may also result in gaps.

SUMMARY OF THE INVENTION

The subject matter of the exemplary embodiments and/or exemplary methods of the present invention is an ultrasonic sensor, which includes a diaphragm cup, a housing and an, in particular vibration-damping, decoupling element, the diaphragm cup and the housing respectively having a lateral surface, the decoupling element being at least partially made from an elastic material, the decoupling element having a continuous recess which is bounded by an inner wall of the decoupling element, the diaphragm cup and/or the housing being at least partially situated in the recess.

According to the exemplary embodiments and/or exemplary methods of the present invention, the inner wall of the decoupling element is tautened by the contraction of the elastic material at least around an area of the lateral surface of the diaphragm cup, circumferentially surrounding the diaphragm cup and/or the housing, and/or a lacquer layer applied on the lateral surface of the diaphragm cup and/or the lateral surface of the housing in such a way that the inner wall in this area rests flush, that is, without a gap, against the lateral surface of the diaphragm cup and/or against the lacquer layer applied on the lateral surface of the diaphragm cup and/or the lateral surface of the housing.

This may be realized for example by equipping the decoupling element in its manufacture with a recess, which is dimensioned to be smaller than is required for the expansion-free accommodation of the diaphragm cup and/or the housing.

In this manner, an early form fit may be established between the decoupling element and the diaphragm cup, the lacquer layer and/or the housing during final assembly. Thus it is possible detachably to connect the decoupling element in a form-locking manner, in particular in a form-locking and force-locking manner, to the diaphragm cup and/or the lacquer layer and/or the housing.

This measure makes it possible to avoid undefined residual sound, parasitic sonic radiation and impressed structure-borne sound, which can result in increased sensor sensitivity and even in flaw echoes.

It is furthermore advantageous to optimize the geometry of the decoupling element since an optimization of the geometry of the sensor receptacle, in particular in the case of sensor receptacles in the form of a punched or drilled hole in a bumper, is not possible without a non-negligible additional technical effort.

In the context of one specific embodiment, the outside dimension of the diaphragm cup defined by the lateral surface is smaller than the outside dimension of the housing defined by the lateral surface, the diaphragm cup being situated/developed on and/or in the housing in such a way that the housing has a step-like cover surface surrounding the diaphragm cup. For this purpose, the inner wall of the decoupling element may be developed in a first area in an essentially complementary fashion with respect to the lateral surface of the diaphragm cup and/or in a second area in an essentially complementary fashion with respect to the step-like cover surface of the housing and/or in a third area in an essentially complementary fashion with respect to an area of the lateral surface of the housing bordering on the step-like cover surface of the housing.

This has the advantage that the flush seat of the decoupling element with respect to the diaphragm surface, which is verifiable from outside, is able to ensure that no gaps arise between the diaphragm cup and the housing in the rear space, which could impair a correct functioning of the ultrasonic system. In connection with the exemplary embodiments and/or exemplary methods of the present invention, "essentially complementary" means in particular that deviations, which are based on a smaller dimensioning of the recess for achieving a contraction force, are comprised.

The diaphragm cup and/or the housing and/or the decoupling element may be developed in a rotationally symmetric manner. In particular, the diaphragm cup and/or the housing may be developed cylindrically or frustoconically.

The diaphragm cup may have a cover surface in addition to the lateral surface. On this cover surface and/or areas of the lateral surface bordering it, the diaphragm cup may have the lacquer layer. In this case, the inner wall of the decoupling element may be tautened by the contraction of the elastic material around the area of the lateral surface of the diaphragm cup provided with the lacquer layer and circumferentially surrounding the diaphragm cup in such a way that the inner wall in this area rests flush and thus without a gap against at least one part of the lacquer layer applied on the lateral surface of the diaphragm cup.

In the first area, the decoupling element may be developed in the form of a hollow cylinder or of a frustum provided with a bore. In order to facilitate the positioning and installation of the sensor, the decoupling element is developed in the first area and may be in the form of a frustum provided with a bore.

In the context of another specific embodiment, the decoupling element is therefore developed in the first area in the form of a frustum provided with a bore.

In the context of another specific embodiment, the decoupling element is developed in the third area in the form of a lip or in the form of a rotationally symmetric body having a bore along the axis of rotation, for example in the form of a hollow cylinder or a frustum provided with a bore. In this manner, a higher installation tolerance of the decoupling element may be achieved. Furthermore, an inner wall developed in the third area in the form of a rotationally symmetric body having a bore along the axis of rotation may result in an improved damping of the parasitic vibrations on the housing since the rotationally symmetric body comprises a large area on the housing.

In connection with another specific embodiment, the area of the housing, in which the step-like cover surface of the housing borders on the lateral surface of the housing, is developed in the form of a rounded edge. For this purpose, the inner wall of the decoupling element is developed in particular in a fourth area in an essentially complementary manner with respect to the rounded edge of the housing. The base circle of the rounded edge may be chosen in such a way that the part of the decoupling element that is complementary to the rounded edge comes to rest on the housing prior to reaching the actually correct position of the decoupling element. Thus it is possible to ensure that sound components, which exist between the lateral surface of the diaphragm cup and the inner wall of the decoupling element or between the cover surface of the housing and a base area of the decoupling element resting on top of it, are not able to exit laterally.

In this manner, the decoupling element may be prevented from "resting" on the sensor edge during assembly, and the decoupling element slides into the correct position when light pressure is applied.

In the context of another specific embodiment, the first area of the inner wall of the decoupling element is tautened by the contraction of the elastic material around the lateral surface of the diaphragm cup and/or the lacquer layer applied on the lateral surface of the diaphragm cup in such a way that the inner wall rests, at least in a part of the first area surrounding the diaphragm cup, flush (without a gap) against the lateral surface of the diaphragm cup and/or the lacquer layer applied on the lateral surface of the diaphragm cup.

In connection with another specific embodiment, the third area of the inner wall of the decoupling element is tautened by the contraction of the elastic material around the lateral surface of the housing in such a way that the inner wall in this area rests flush (without a gap) against the lateral surface of the housing. The geometric design of the lip may be performed in such a way that a certain pre-stress is provided, which ensures that the lip or the rotationally symmetric body having the bore along the axis of rotation comes to rest on the corner/edge of the sensor housing. This results in an additional component in the radial direction besides an axial support surface of the second area of the inner wall on the step-like cover surface of the housing.

In connection with another specific embodiment, the fourth area of the inner wall of the decoupling element is tautened by the contraction of the elastic material around the rounded edge of the housing in such a way that the inner wall in this area rests flush (without a gap) against the rounded edge of the housing.

In particular, the decoupling element has no further recesses in addition to the recess for accommodating the diaphragm cup and/or the housing. The decoupling element may have no recesses extending from the recess for accommodating the diaphragm cup and/or the housing radially through the decoupling element.

In the context of another specific embodiment, the lateral surface of the housing has at least one recess and the inner wall of the decoupling element has at least one elevation and/or the lateral surface of the housing has at least one elevation and the inner wall of the decoupling element has at least one recess, in particular one that does not extend through the decoupling element, for latching the decoupling element into the housing. This makes it possible to reinforce the connection between the decoupling element and the diaphragm cup or the housing while preventing the formation of gaps.

The decoupling element may have no recesses and elevations on its outer side for latching the decoupling element into a sensor receptacle. The reason for this is that such a latching could promote the formation of a gap between the decoupling element and the diaphragm cup or the housing.

Another subject matter is an ultrasonic sensor system, which comprises an ultrasonic sensor and a sensor receptacle for accommodating the ultrasonic sensor.

The sensor receptacle may be a bumper of a motor vehicle for example. The sensor receptacle may be in particular a bumper for a motor vehicle provided with a recess. The sensor receptacle may be a bumper provided with a recess for example, which has a plastic injection molded part mounted in the recess for improving the accommodation of the ultrasonic sensor.

Additional advantages and advantageous developments of the exemplary embodiments and/or exemplary methods of the present invention are illustrated by the drawings and elucidated in the following description. It should be noted that the drawing has only a descriptive character and is not intended to limit the invention in any form.

BRIEF DESCRIPTION OF THE DRAWINGS

FIG. 1b shows a reduced, schematic cross-section through the ultrasonic sensor shown in FIG. 1a.

DETAILED DESCRIPTION

Figure 1A:
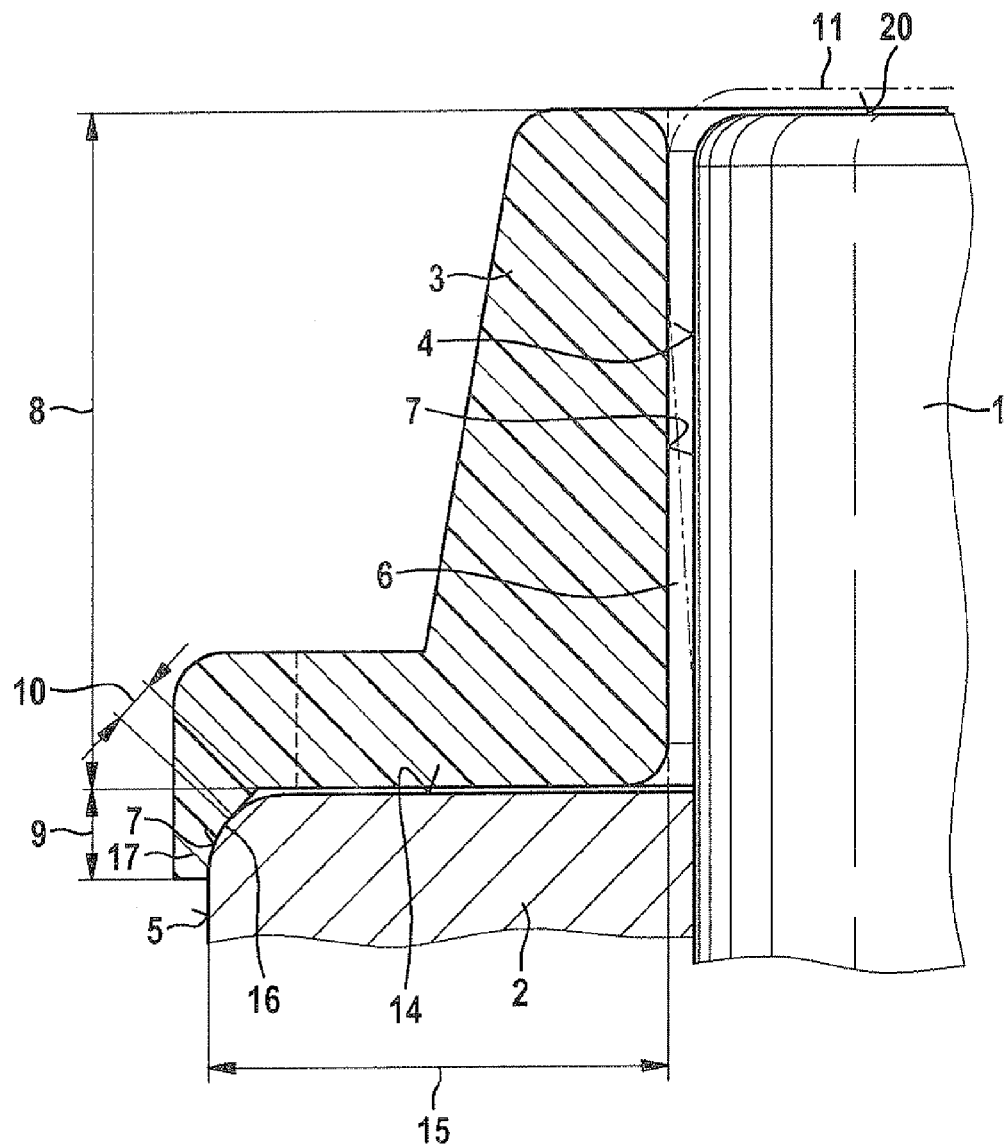
FIG. 1a shows an enlarged, schematic section of a cross-section through a specific embodiment of an ultrasonic sensor according to the present invention.
Figure 1B:
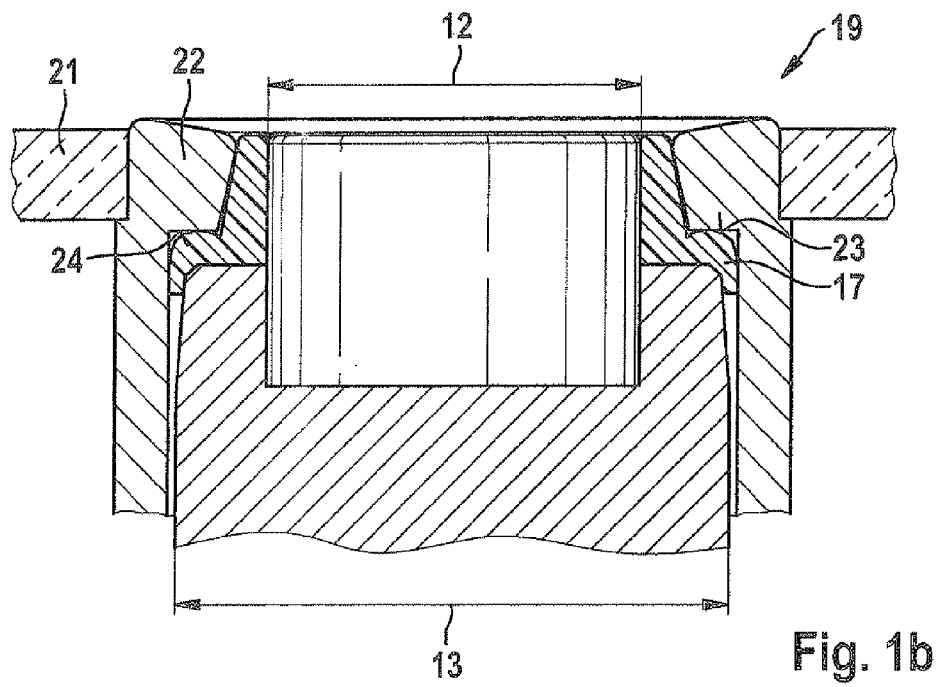

FIGS. 1a and 1b show a specific embodiment of an ultrasonic sensor according to the present invention, which comprises a diaphragm cup 1, a housing 2 and a decoupling element 3. Diaphragm cup 1 and housing 2 respectively have a lateral surface 4, 5. A lacquer layer 11 is applied on cover surface 20 of diaphragm cup 1 and on a part of lateral surface 4 of diaphragm cup 1, in particular on an area of lateral surface 4 of diaphragm cup 1 that borders cover surface 20. Decoupling element 3 is at least partly made from an elastic material and has a continuous recess 6, which is bounded by an inner wall 7 of decoupling element 3. Diaphragm cup 1 and housing 2 are situated at least partially in recess 6. Inner wall 7 of decoupling element 3 is tautened by the contraction of the elastic material around two areas 9, 10 of lateral surface 5 of housing 2, circumferentially surrounding housing 2, and around an area 8 of lateral surface 4 of diaphragm cup 1, provided with lacquer layer 11 and circumferentially surrounding diaphragm cup 1, in such a way that inner wall 7 in these areas 8, 9, 10 rests flush and thus without a gap against lateral surface 5 of housing 2 and against lacquer layer 11 applied on lateral surface 4 of diaphragm cup 1.

FIGS. 1a and 1b furthermore show that outside dimension 12 of diaphragm cup 1 defined by lateral surface 4 is smaller than outside dimension 13 of housing 2 defined by lateral surface 5. Diaphragm cup 1 is situated in such a way on housing 2 that housing 2 has a step-like, in particular annular, cover surface 14 surrounding diaphragm cup 1.

In addition, FIGS. 1a and 1b show that inner wall 7 of the decoupling element 3 may be developed in a first area 8 in an essentially complementary fashion with respect to the lateral surface 4 of the diaphragm cup 1, in a second area 15 in an essentially complementary fashion with respect to the step-like cover surface 14 of the housing 2 and in a third area 9 in an essentially complementary fashion with respect to an area of the lateral surface 5 of housing 2 bordering the step-like cover surface 14 of housing 2.

In first area 8, decoupling element 3 is developed in the form of a frustum provided with a bore. This facilitates in particular the positioning and installation of the sensor. In third area 9, inner wall 7 of decoupling element 3 is developed in the form of a lip 17. Third area 9 of inner wall 7 of decoupling element 3 is tautened by the contraction of the elastic material around the lateral surface 5 of housing 2 in such a way that inner wall 7 in this area 9 rests flush (without a gap) against lateral surface 5 of housing 2.

The area of housing 2, in which step-like cover surface 14 of housing 2 borders on lateral surface 5 of housing 2 is developed in the form of a rounded edge 16. Inner wall 7 of decoupling element 3 is developed in a fourth area 10 in an essentially complementary fashion with respect to the rounded edge 16 of housing 2. Fourth area 16 of inner wall 7 of decoupling element 3 is tautened by the contraction of the elastic material around rounded edge 16 of housing 2 in such a way that inner wall 7 in this area 10 rests flush (without a gap) against rounded edge 16 of housing 2.

FIG. 1b additionally shows that the ultrasonic sensor is accommodated by a sensor receptacle 19. The sensor receptacle is a bumper 21 for a motor vehicle, which is provided with a recess, in which a plastic injection molded part 22 is mounted for improving the accommodation of the ultrasonic sensor. FIG. 1b illustrates furthermore that after the installation, decoupling element 3 deforms due to the elasticity of the material in such a way that it yields into the existing free space between sensor receptacle 19, in particular plastic injection molded part 22 of sensor receptacle 19, and housing 2, in particular in a direction parallel to the sensor axis. In the process, surface 23 of second area 12 of decoupling element 3 developed in complementary fashion with respect to step-like cover surface 14 is pressed against sensor receptacle 19, in particular plastic injection molded part 22 of sensor receptacle 19, furthermore in particular inner cover surface 24 of sensor receptacle 19 or of plastic injection molded part 22 of sensor receptacle 19. This prevents sound from propagating between sensor receptacle 19, in particular plastic injection molded part 22 of the sensor receptacle, and the decoupling element.

Figure 2:
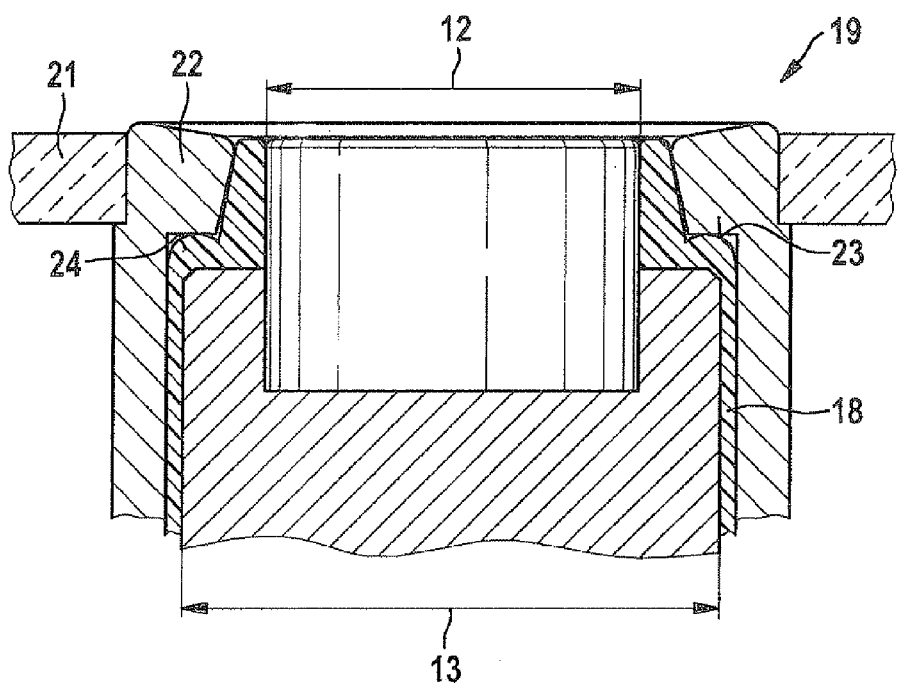
FIG. 2 shows an enlarged, schematic cross-section through another specific embodiment of an ultrasonic sensor according to the present invention.

The ultrasonic sensor shown in FIG. 2 differs from the ultrasonic sensor shown in FIGS. 1a and 1b in that decoupling element 3 in third area 9 is developed in the form of a rotationally symmetric body having a bore along the axis of rotation.

What is claimed is:

1. An ultrasonic sensor, comprising:
    a diaphragm cup;
    a housing; and
    a decoupling element;
        wherein the diaphragm cup and the housing respectively have a lateral surface and is situated on and/or in the housing so that the housing has a step-like cover surface surrounding the diaphragm cup,
        wherein the decoupling element is made at least partially from an elastic material,
        wherein the decoupling element has a continuous recess, which is bounded by an inner wall of the decoupling element,
        wherein at least one of the diaphragm cup and the housing is at least partially situated in the recess,
        wherein the inner wall of the decoupling element is tautened by the contraction of the elastic material at least around an area of the lateral surface of the diaphragm cup,
        wherein the inner wall of the decoupling element circumferentially surrounds the diaphragm cup and/or a lacquer layer applied on the lateral surface of the diaphragm cup and the lateral surface of the housing, and
        wherein the inner wall of the decoupling element rests flush against the lateral surface of the diaphragm cup and/or the lacquer layer applied on the lateral surface of the diaphragm cup and the lateral surface of the housing.

2. The ultrasonic sensor of claim 1, wherein
    an outer diameter of the diaphragm cup is smaller than an outer diameter of the housing, the diaphragm cup is situated on and/or in the housing so that the housing has a step-like cover surface surrounding the diaphragm cup,
    the inner wall of the decoupling element is configured in a first area in an essentially complementary fashion with respect to the lateral surface of the diaphragm cup and/or the lacquer layer applied on the lateral surface of the diaphragm cup,
    the inner wall of the decoupling element is developed in a second area in an essentially complementary fashion with respect to the step-like cover surface of the housing, and
    the inner wall of the decoupling element is developed in a third area in an essentially complementary fashion with respect to an area of the lateral surface of the housing bordering on the step-like cover surface of the housing.

3. The ultrasonic sensor of claim 2, wherein the third area of the inner wall of decoupling element is tautened by the contraction of the elastic material around the lateral surface of the housing so that the inner wall of the decoupling element rests flush against the lateral surface of the housing.

4. The ultrasonic sensor of claim 2, wherein the area of the housing, in which the step-like cover surface of the housing borders on the lateral surface of the housing is in the form of a rounded edge, the inner wall of the decoupling element is in a fourth area in an essentially complementary fashion with respect to the rounded edge of the housing.

5. The ultrasonic sensor of claim 4, wherein the fourth area of the inner wall of decoupling element is tautened by the contraction of the elastic material around the rounded edge of the housing so that the inner wall of decoupling element rests flush against the rounded edge of the housing.

6. The ultrasonic sensor of claim 1, wherein the lateral surface of the housing has at least one recess and the inner wall of the decoupling element has at least one elevation; and/or the lateral surface of the housing has at least one elevation and the inner wall of the decoupling element has at least one recess for latching the decoupling element into the housing.

7. The ultrasonic sensor of claim 2, wherein the decoupling element is in the third area in the form of a lip or in the form of a rotationally symmetric body having a bore along an axis of rotation, in the form of a hollow cylinder or a frustum provided with a bore.

8. The ultrasonic sensor of claim 2, wherein the decoupling element is in the first area in the form of a frustum provided with a bore.

9. The ultrasonic sensor of claim 2, wherein the first area of the inner wall of the decoupling element is tautened by the contraction of the elastic material around the lateral surface of the diaphragm cup and/or the lacquer layer applied on the lateral surface of the diaphragm cup so that the inner wall rests, at least in a part of the first area surrounding the diaphragm cup, flush against the lateral surface of the diaphragm cup and/or the lacquer layer applied on the lateral surface of the diaphragm cup.

10. An ultrasonic sensor system, comprising:
   an ultrasonic sensor; and
   a sensor receptacle for accommodating the ultrasonic sensor;
   wherein the ultrasonic sensor includes:
      a diaphragm cup;
      a housing; and
      a decoupling element;
      wherein the diaphragm cup and the housing respectively have a lateral surface,
      wherein the decoupling element is made at least partially from an elastic material,
      wherein the decoupling element has a continuous recess, which is bounded by an inner wall of the decoupling element,
      wherein at least one of the diaphragm cup and the housing is at least partially situated in the recess, and
      wherein the inner wall of the decoupling element is tautened by the contraction of the elastic material at least around an area of the lateral surface of the diaphragm cup and circumferentially surrounds the diaphragm cup, the housing, and/or a lacquer layer applied on the lateral surface of the diaphragm cup, and the lateral surface of the housing so that the inner wall of the decoupling element rests flush against the lateral surface of the diaphragm cup, and/or the lacquer layer applied on the lateral surface of the diaphragm cup, and the lateral surface of the housing.

11. The ultrasonic sensor of claim 3, wherein flush seating of the decoupling element with respect to the diaphragm surface and the rounded edge of the housing ensures that there are no gaps between the diaphragm cup and the housing.

* * * * *